United States Patent [19]

Maddick

[11] 4,235,488
[45] Nov. 25, 1980

[54] BICYCLE PEDAL CRANK HANGER

[76] Inventor: Stephen Maddick, 16614 Washington Ave., Union Grove, Wis. 53182

[21] Appl. No.: 71,300

[22] Filed: Aug. 30, 1979

[51] Int. Cl.³ .............................................. F16C 3/06
[52] U.S. Cl. ............................... 308/23.5; 308/179.5; 308/192
[58] Field of Search ................... 308/23.5, 179.5, 192, 308/187.1, 201, 23, 179

[56] References Cited

U.S. PATENT DOCUMENTS

| 623,999 | 5/1899 | Dunlop et al. | 308/192 |
| 1,105,268 | 7/1914 | Gohlke | 308/187.1 |
| 3,919,898 | 11/1975 | Sugino | 308/23.5 |

4,154,327  5/1979  Haeussinger .......................... 308/192

Primary Examiner—Lenard A. Footland
Attorney, Agent, or Firm—Arthur J. Hansmann

[57] ABSTRACT

A bicycle pedal crank hanger including a sleeve on the bicycle frame and having ribs affixed to the interior of the sleeve and spaced from the ends thereof with openings in the ribs so that lugs from an adapter can be inserted through the openings and held in the sleeve by the ribs. Cam surfaces are on the axially inward sides of the ribs, and the lugs engage the cam surface for snugly seating the adapter in the sleeve and the adapter has a flange on the exterior for engaging the outer edge of the sleeve. A bearing and the crank axle are supported in the adapter.

5 Claims, 2 Drawing Figures

BICYCLE PEDAL CRANK HANGER

This invention relates to a bicycle pedal crank hanger, and, more particularly, it relates to an arrangement for converting a large accommodation for the bicycle crank to a smaller accommodation so that, for instance, the smaller racing bicycle type of crank can be utilized in a standard bicycle.

BACKGROUND OF THE INVENTION

The prior art is already aware of various bicycle hanger arrangements, and some very old patents showing bicycles are U.S. Pat. Nos. 523,562 and 556,004 and 627,946 and 978,756 and 1,593,474 and 1,105,268. Still further, the prior art is already aware of various rotation bearing arrangements, such as those found in U.S. Pat. Nos. 623,999 and 914,714, both of which show sleeves and bearing supports therein for a rotatable pin or axle.

The present invention differs from the prior art in that it relates to bicycle pedal crank hangers which can be converted from a large or standard type hanger to a smaller hanger such as that used in racing bicycles. Further, this is accomplished without the use of additional threaded members, and only an inter-locking assembly is utilized and one which is self-locking in the forward direction of rotation of the pedal crank, all so that the hanger of this invention will not inadvertently become disassembled or loose. Still further, the pedal crank hanger assembly of this invention does not require threaded parts, beyond those of the standard bearing, and thus the problem of stripping the bearings is not involved when this assembly is utilized.

Standard bicycles of the type used for all purposes, except racing, employ a sleeve in which the so-called hanger is mounted. The hanger consists usually of an axle from one end of which is projected an integral pedal arm and from the opposite end of which is projected a second integral pedal arm to which the sprocket is attached. The hubs of such bicycle frames are large, usually two and one-half inches in diameter, and the axle is supported therein by ball bearing assemblies which include stationary races, pressed into the opposite ends of the sleeve, and movable races attached to the axle. The ball bearings which engage these races are not free ball bearings, that is, they are supported in a cage or framework which may be handled as a unit.

As a result of this construction, the diameter of the ball bearing races is large, being only slightly smaller than the diameter of the sleeve, and the number and weight of the moving parts are high. Furthermore, in case of damage to the hanger assembly, such as, for example, the stripping of the threads in a pedal arm, many parts of the assembly which are still serviceable have to be discarded since the axle of the pedal arm structure is in one piece.

In the so-called racing bicycle frames, the sleeve is of smaller diameter than on a standard bicycle and is threaded internally to receive the stationary ball bearing races. The axle of a racing bicycle is in one piece, one pedal arm and the sproket constitute a second piece, and the other pedal arm a third piece, these two pedal arms being fixed on the axle after it is properly positioned in the sleeve. The axle carries the movable races which, in many instances, are formed integrally with it and the ball bearings which engage the movable and stationary races are entirely free, that is, they are not supported in a cage as in the case of a standard bicycle.

As a result of ths construction, the number of and diameter of the moving parts are reduced and pedaling of the bicycle is made much easier. Furthermore, in case of damage to one of the parts, say for instance a pedal arm, only the damaged part need be replaced to put the assembly back into first class condition.

One source of trouble in the racing bicycle assembly is the internal threads in the hub, which frequently become damaged or stripped, and are difficult, if not impossible, to repair other than by reaming the hub out and re-threading the same and thereafter using the more expensive over-size fittings.

The present invention renders available to the users of standard bicycles the advantages of a three piece hanger by providing a method of satisfactorily mounting such a hanger in any existing standard two and one-half inch sleeve, this conversion being made without materially changing the sleeve structure.

Other objects and advantages will become apparent upon reading the following description in light of the accompanying drawings.

DETAILED DESCRIPTION OF THE PREFERRED EMBODIMENT

Figure 1:
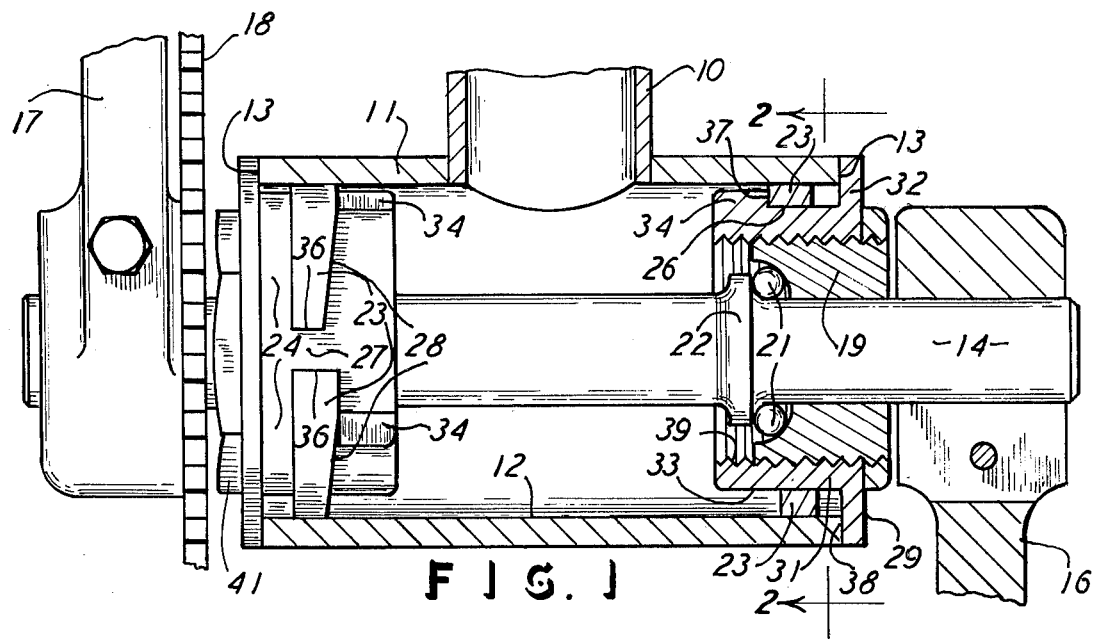
FIG. 1 is a sectional view of a bicycle hanger of this invention.
Figure 2:
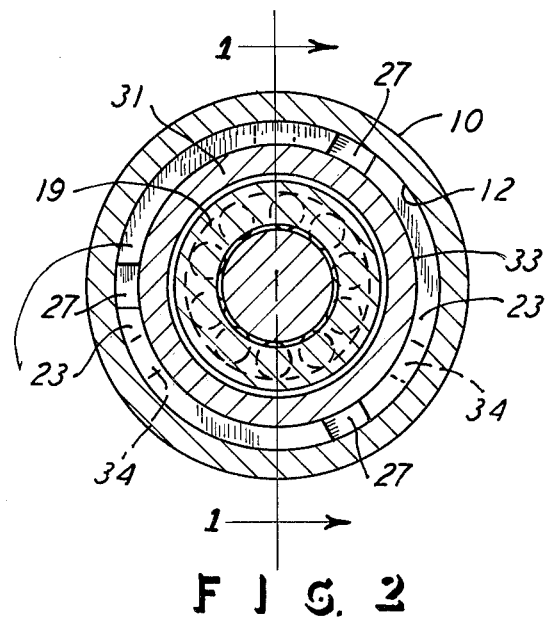
FIG. 2 is a sectional view taken on the line 2-2 of FIG. 1.

The convertible hanger of this invention includes the bicycle frame shown in its tubular piece 10 and its standard sleeve 11 which has its internal diameter at the interior surface 12 and which has end surfaces 13 which are disposed on planes transverse to the longitudinal axis of the sleeve 11. The crank axle 14 extends beyond the sleeve ends 13 and has crank arms 16 and 17 attached thereto. Also, a sprocket chain 18 is suitably supported by means of a usual sprocket (not shown) underneath the chain 18. Further, a ball bearing outer race 19 surrounds the axle 14 at each end thereof, and ball bearings 21 are interposed between the race 19 and the axle 14 at the shoulder 22 which is integral with the axle 14.

The hanger and assembly described is shown in the orientation of a forward direction, such that the frame piece 10 is directed forwardly and thus the axle 14 would rotate in a clockwise direction when viewed from its right end in FIG. 1, and this will be mentioned again. It will now also be seen and understood that the sleeve 11 is of a large diameter which is commonly used in a standard bicycle, but that sleeve is too large for receiving a racing bicycle hanger which was just described, and thus the arrangement of this invention converts the bicycle to a mode and arrangement which will receive the smaller racing bicycle hanger which is shown by the axle 14 in FIG. 1. Because the racing hanger is smaller than the standard hanger, the present invention is required in order to be able to assemble the racing hanger, including the axle 14, in the standard or large sleeve 11, as shown in FIG. 1.

Thus the sleeve 11 has circular open ends at each end thereof adjacent its end surfaces 13. Arcuate ribs 23 are suitably affixed on the interior wall 12 of the sleeve 11 at each open end of the sleeve 11 and spaced inwardly therefrom by the space designated 24. Thus the ribs 23 extend around the interior of each end of the sleeve and present a radially inward projection in the sleeve 11 and with that projection being of a diameter less than the inner diameter of the sleeve, as shown by the inner diameter designated 26 formed by the ribs 23 in each end of the sleeve 11.

Thus, there are actually three lengths of ribs 23 affixed in line at each end of the sleeve 11, and the ribs are spaced apart to form the spacings 27 between the ends of every two ribs 23. Further, each rib 23 has a shoulder 28 faced inwardly on the sleeve 11, and thus the shoulders 28 face each other in the line of ribs 23 at each end of the sleeve 11. The shoulders 28 are shown at a slight angle, relative to the plane transverse to the longitudinal axis of the sleeve 11, and that angle therefore presents the shoulders 28 as cam surfaces, as seen in the left end of FIG. 1. The cam surfaces 28 extend from the openings 27 and actually are oriented to extend further away from the sleeve respective end wall 13 in the forward direction of rotation of the crank or axle 14, and that is the clockwise direction as viewed from the right end of FIG. 1, as mentioned above.

Therefore, the ribs 23 are in the nature of one discontinuous rib or circle around the interior of the sleeve 11, to present the openings 27 and the cam surfaces 28.

Finally, each end of the sleeve 11 receives an adapter 29 which has a cylindrical portion 31 and an end circular flange 32. The flange 32 is assembled to be in snug contact with the sleeve end wall 13, and the cylindrical portion 31 has an outer circumference 33 which is snug with the inner circumference 26 of the ribs 23. Thus, in the assembled position, the adapter 29 is bearingly supported on the rib inner circumference 26 and against the sleeve outer surface 13. As such, the adapter 29 is completely stable and immovable in the assembled position, and that assembly is achieved at each end of the sleeve 11.

Further, the adapter 29 has projections or lugs 34 which extend radially beyond the circular surface 33. The width of the lugs 34 is less than the spacing between the rib ends 36 which define the openings 27, and thus the lugs 34 can pass through the openings 27 and the shoulder portions 37 on the lugs 34 engage the rib cam surfaces 28 and ride therealong when the adapters are rotated in the clockwise or forward direction mentioned. Accordingly, the adapters 29 are thus securely assembled and are actually forced into position and held under force of the lugs 34 sliding along the cam surfaces 28 to insure and maintain the two spaced-apart bearing surfaces at 26 and 38. Thus, in the forward movement of the pedal arm or cranks 16 and 17, the adapters 29 will be urged into their seated or tight position and will not come loose but will remain firmly assembled.

The drawings show that there are three arcuate ribs 23 and thus there are three spaces 27 and thus three lugs 34, all for the secure and ready assembly which does not require any threading between the parts described.

The bearing race 19 is threaded on its outer circumference, and the adapter 29 is provided with inner diameter threads 39, and thus the race 19 can thread into the adapter 29 and support the ball bearings 21 and thus provide the anti-friction support for the axle 14. The usual lock nut 41 also threads with the bearing 19 and bears against the adapter 29 to secure the bearing 19 in the adapter 29, as shown. Of course the ribs 23 can be secured within the sleeve 11, in the manner described and shown, by any conventional means, such as brazing or welding or the like. The three arcuate lengths of the ribs 23 thus provide the wedging or cam anchoring for the three lugs 34, and there is thus a stable support therebetween by virtue of the tripod arrangement which is more stable than where two lugs or even four lugs.

What is claimed is:

1. A bicycle pedal crank hanger for converting from a large hanger to a smaller hanger, comprising a bicycle frame sleeve having a circular open end at each end thereof, and an end surface fully co-incident with a plane transverse to the longitudinal axis of said sleeve at each opposite end of said sleeve, arcuate ribs affixed inside said sleeve at each said open end and spaced inwardly from said end surfaces and extending around the interior of each end of said sleeve and presenting an interior projection in said sleeve of a diameter less than the inner diameter of said sleeve, said ribs at each end of said sleeve being spaced apart in end-to-end relation to present one discontinuous circle of rib around the interior of each end of said sleeve and with the spaced-apart ends of said ribs presenting an opening therebetween, each of said ribs having a shoulder faced axially inwardly in said sleeve and toward each other and having a length thereof adjacent said rib opening and disposed at an angle relative to the transverse plane of said sleeve to present said shoulders as cam surfaces and with said cam surfaces oriented from said respective adjacent openings toward the interior of said sleeve at each end of said sleeve, an adapter at each end of said sleeve and having a circular portion and lugs extending outwardly thereon at one end of said portion for respectively passing through said openings and abutting said cam surfaces to lock said adapter to said sleeve, said circular portion having an outer diameter which is snugly mated with the inner said diameter of said ribs to bear on said ribs, each said adapter having a shoulder in snug overlying contact with said sleeve end surfaces for stable support on said sleeve, an axle rotatably supported in said adapter and having pedal crank arms attached thereto for a forward direction of rotation of said axle and with the said orientation of said cam surfaces being in the direction of said forward rotation to assure that said adapters remain secure with said ribs and said sleeve.

2. The pedal crank hanger as claimed in claim 1, wherein they are three of said ribs and three of said shoulders and three of said lugs in each end of said sleeve.

3. The pedal crank hanger as claimed in claim 1, including a rotation bearing member interposed between said adapter and said axle and being connected with said adapter.

4. The pedal crank hanger as claimed in claim 3, wherein said bearing member is threaded into said adapter and is a ball bearing imposing a rotational force on said adapter and against said cam surfaces in the forward direction of pedal crank rotation.

5. The pedal crank hanger as claimed in claim 1, wherein said ribs are spaced from each respective said adapter shoulder for stable support of said adapters in said sleeve.

* * * * *